March 7, 1967 E. W. McFEATERS ETAL 3,307,797
REEL RETAINING ASSEMBLY
Filed June 4, 1965 2 Sheets-Sheet 1
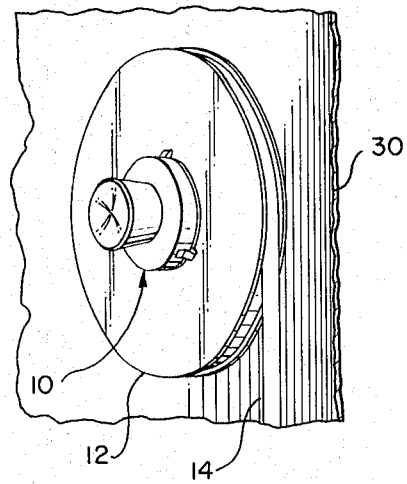
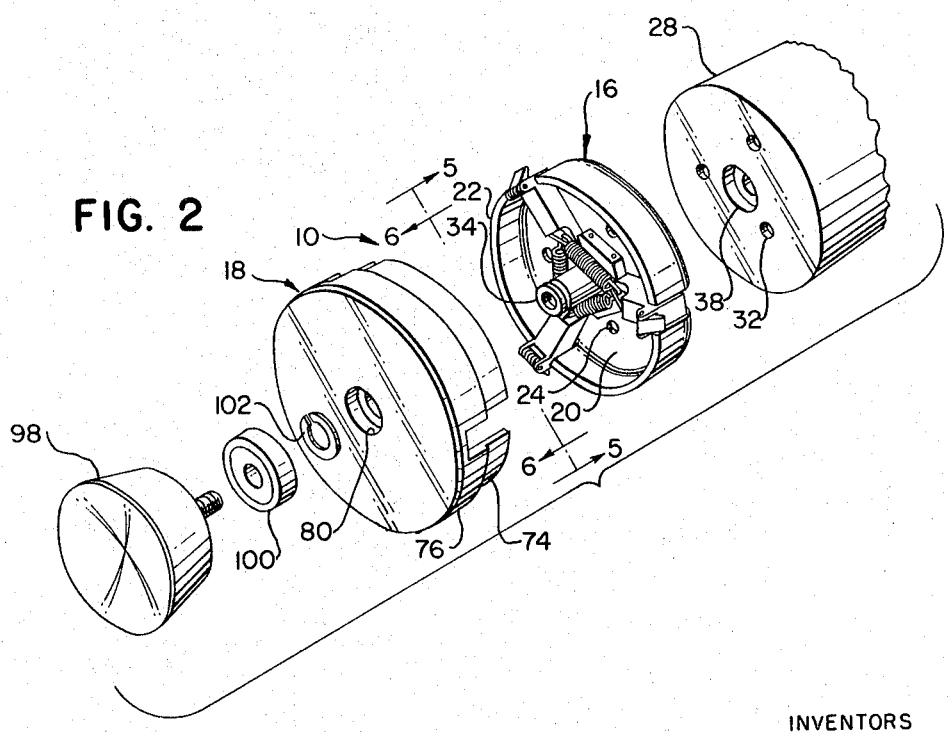
INVENTORS
EARL W. MC FEATERS &
CHARLES H. WAGNER
BY
THEIR ATTORNEYS March 7, 1967 E. W. McFEATERS ETAL 3,307,797
REEL RETAINING ASSEMBLY Filed June 4, 1965 2 Sheets-Sheet 2

INVENTORS
EARL W. MCFEATERS &
CHARLES H. WAGNER

BY
THEIR ATTORNEYS

UNITED STATES PATENT OFFICE 3,307,797
Patented Mar. 7, 1967

3,307,797
REEL RETAINING ASSEMBLY
Earl W. McFeaters, Dayton, and Charles H. Wagner,
Xenia, Ohio, assignors to The National Cash Register
Company, Dayton, Ohio, a corporation of Maryland
Filed June 4, 1965, Ser. No. 461,317
6 Claims. (Cl. 242—68.3)

This invention relates to an assembly for releasably holding a reel in proper position in a machine, and more particularly it relates to an assembly which is especially useful in aligning and releasably holding a magnetic tape reel for rotation with a rotating member of a business machine such as a magnetic tape handler.

In one of the prior-art constructions for reel retaining assemblies of the above type, one end of the rotating member such as a shaft of the machine is provided with a reduced diameter portion. A "doughnut-shaped" or an O type rubber ring is then positioned on the reduced diameter portion, and the mounting aperture of the reel is positioned to surround the rubber ring. A suitable retaining member is threadedly secured to the shaft, and, as the retaining member is threadedly advanced on said shaft toward the ring, it compresses the rubber ring and thereby expands the ring radially outwardly to engage the mounting aperture of the reel and holds the reel for rotation with said shaft.

Some of the problems encountered with the above prior-art construction are that the reel is not accurately located on the rotating shaft and therefore has a tendency to wobble or vibrate when rotated, and also that the machine operator is required to use two hands when mounting the reel.

Accordingly, a primary object of this invention is to provide a reel retaining assembly for use with a rotatable member, which assembly is economical to produce and which accurately aligns, locates, and releasably holds a reel thereon for concentric rotation with the rotatable member.

Another object of this invention is to produce a reel retaining assembly of the above type which can be conveniently operated with one hand and which requires little force on the part of the operator to secure a reel thereon.

These and other objects and advantages will become more readily understood in connection with the following description and the drawings, in which:

FIGURE 1 is a general perspective view showing a reel in place on the reel retaining assembly of this invention in a typical application;

FIGURE 2 is an enlarged general exploded view in perspective of the reel retaining assembly shown in FIGURE 1;

Figure 3:
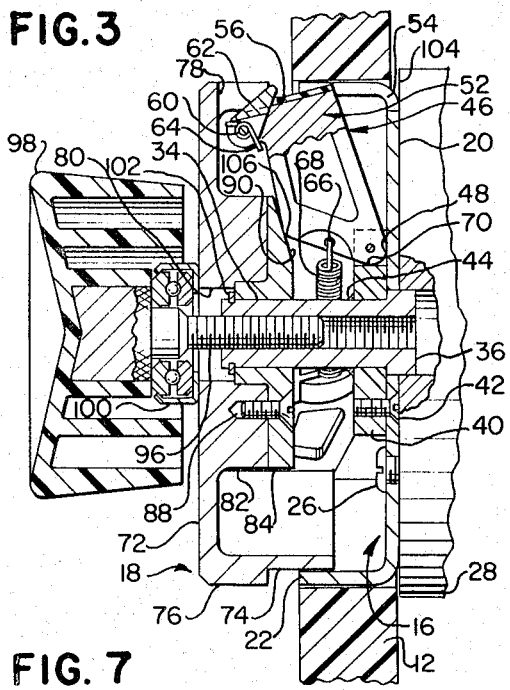
FIGURE 3 is a cross-sectional view of a reel and the reel retaining assembly taken along a diameter of the assembly through one of the jaw members, with the jaw members retracted to enable the reel to be placed on the assembly.

Referring to the drawings in more detail, FIGURE 1 shows a general perspective view of the reel retaining assembly of this invention with a reel in place thereon. The reel retaining assembly, generally designated 10, is secured to a rotatable supporting means, which may also be used to drive the assembly, and the reel 12, on which tape 14 is wound, is releasably secured to the assembly for rotation therewith.

FIGURE 2 is a general exploded view in perspective of the assembly 10, which comprises a first cup-shaped housing member, generally designated 16, which telescopingly receives a second cup-shaped housing member, generally designated 18.

In the preferred embodiment, the first housing member 16 has a circular base 20 with a circumferential wall 22 integrally joined therewith and extending outwardly therefrom as shown. The base 20 is provided with suitable apertures 24, in which mounting screws 26 are inserted to detachably secure the base 20 to the supporting member 28 of a machine 30. The supporting member 28 is provided with suitable tapped holes 32 to receive the screws 26 and thereby mount the housing member 16 thereon for concentric rotation therewith.

The base 20 of the first housing member 16 is apertured at its center to receive an internally-threaded hollow cylindrical member 34, as shown in FIGURES 2 through 5. The member 34 is provided with an enlarged diameter portion 36, which is received in a cooperating aperture 38 of the supporting member 28 and thereby assists in maintaining concentric alignment of the housing member 16 with the member 28.

Figure 5:
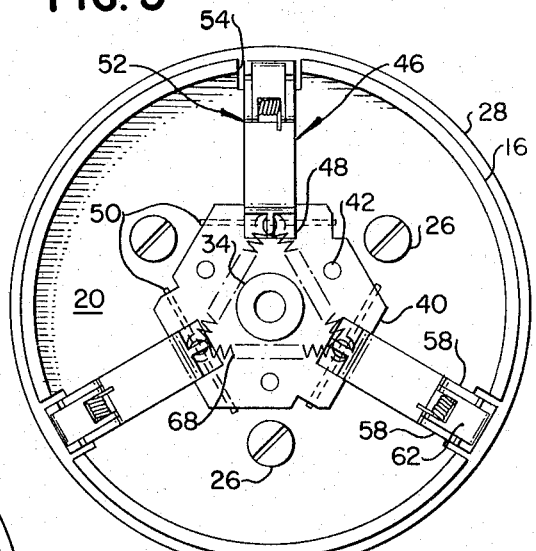
FIGURE 5 is a plan view of one member of the retaining assembly, taken along the line 5—5 of FIGURE 2.

Located inside the housing member 16 is a mounting plate 40, which is secured to the base and is apertured at the center to receive the cylindrical member 34, as shown in FIGURES 3 and 5. The enlarged diameter portion 36 of the cylindrical member 34, mentioned earlier, abuts against the plate 40, and fasteners 42 are used to detachably secure the plate to the base 20 of the housing member 16. The member 34 is welded, as at 44, to the plate 42 to secure the member 34 against axial longitudnal movement relative to the base 20.

The jaw members, generally designated 46, are positioned in the housing along radial lines therein, as shown in FIGURE 5, for example. These jaw members are provided with first ends 48, which are received in notches in the plate 40 and are pivotally secured to the plate by pins 50 passing through apertures in said first ends and said plate. The pins 50 are positioned in said plate 40 so as to enable said jaw members to pivot along radial lines in said housing 16.

The wall 22 of the housing 16 is provided with slots 54 equally spaced on its perimeter and in radial alignment with the jaw members, so as to enable the outer ends 52 of the jaw members 46 to move out of the housing 16 and to thereby engage the reel 12, as will be explained later.

The outer ends 52 of the jaw members are generally flat or may be arcuately shaped to conform to the shape of the mounting aperture of the reel to be supported by the assembly 10, and these ends have resilient pads 56, made of rubber or plastic, secured thereto.

Each outer end 52 of the jaw member is also provided with spaced parallel segments 58, which are suitably apertured to receive a pin 60, shown in FIGURE 3. A pivotable member or finger 62 is positioned between the spaced segments 58 and is pivotally mounted on the pin 60. A suitable torsion spring 64 is used to bias the finger 62 in a clockwise direction, as viewed in FIGURE 3.

The inner end of each jaw member 46 is apertured at 66 to receive one end of a spring 68. The springs 68 are connected between adjacent jaw members, as shown in FIGURE 5, and are used to resiliently urge the jaw members counter-clockwise, as viewed in FIGURE 3, away from the slots 54 in the housing 16. When the housing 18 is separated from the housing 16, the surface 70 of the jaw member abuts against a surface in the adjacent notch in the mounting plate 40 to limit the counter-clockwise movement of the jaw members, which facilitates assembly of the reel retaining assembly 10.

The housing 18 is provided with a circular base 72 and a circumferential wall 74, which is slidably received in the wall 22 of the housing 16 for telescoping engagement with the housing 16, as shown in FIGURE 3. The diameter of the housing 18 at the wall 76 is equal to the outer diameter of the wall 22 of the housing 16 and slightly less than the diameter of the central mounting aperture of the reel 12, so as to enable the reel to be slidably mounted on the assembly 10 when in the assembled relationship shown in FIGURE 3.

The circumferential wall of the housing 18 is provided with a plurality of slots 78, which are equal in size and number to the slots in the housing 16, so as to enable the slots of both housings to be in aligned relationship to permit the outer ends of the jaw members 46 to pass therethrough.

Figure 6:
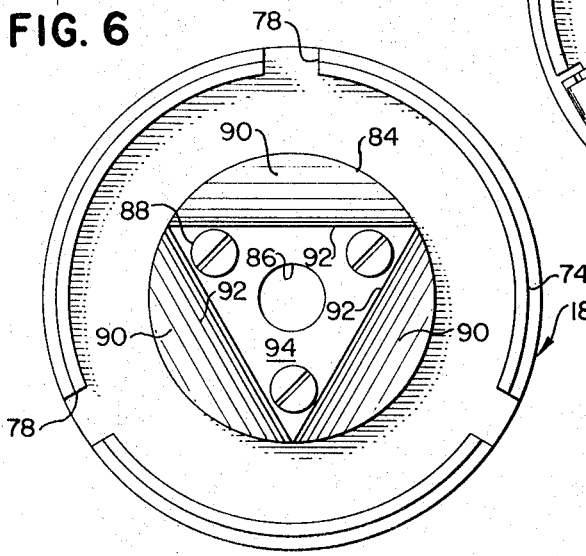
FIGURE 6 is a plan view of a second member of the retaining assembly, taken along the line 6—6 of FIGURE 2.

The housing 18 is formed with an inwardly-extending boss 82, through which a central aperture 80 extends. A cam 84 is provided with a hole 86, which is concentric with the aperture 80, and the cam 84 is secured to the boss 82 by fasteners 88, as shown in FIGURES 3 and 6.

The cam 84 is provided with identical planar cam surfaces 90, with one such surface provided for each jaw member used in the reel retaining assembly. The cam surfaces are arranged in aligned relationship with the slots 78, so as to enable the chord line 92 to be perpendicular to the radial line along which the related jaw member 46 is positioned when the reel retaining assembly 10 is assembled. A face 94 on the cam 84 is perpendicular to the axis of rotation of the assembly 10, and the face of each cam surface 90 slopes away from the chord line 92 towards the outer periphery of the boss 82, as shown in FIGURES 3 and 6.

When the housing 18 is slidably mounted in the housing 16, the hollow cylindrical member 34 is slidably received in the hole 86 on the cam 84. This assists in maintaining the proper axial inward movement of the housing 18 towards the housing 16. The cylindrical member 34 is internally threaded to receive a screw 96, which is secured to a knob 98. A locking ring 102 is inserted into a cooperating recess on the member 34 to limit the movement of the housing 18 away from the housing 16, as shown in FIGURE 3. A suitable bearing 100, positioned between the knob 98 and the base 72 of the housing 18, minimizes friction therebetween when the knob 98 is turned to advance the housing 18 towards the housing 16.

In use, the reel retaining assembly 10 is secured to the supporting member 28, which may be a capstan or a drive shaft, as shown in FIGURE 3. The supporting member 28 is larger in diameter than the outer diameters of the housings 16 and 18, so as to provide a shoulder 104, against which the reel 12 can abut.

The knob 98 is turned in a direction to allow the housing 18 to move away from the housing 16 (to the left, FIGURE 3) and enable the springs 68 to rock the jaw members about their pivots and withdraw the outer ends of the jaw members 52 inside the housings.

With the outer ends of the jaw members inside the housings, the central mounting aperture of the reel may be slipped thereover. As the knob 98 is turned to advance the screw 96 in the threaded member 34, the housing 18 is pushed towards the housing 16. This action brings the cam surfaces 90 into engagement with surfaces 106 on the jaw members 52, causing the jaw members to pivot clockwise (FIGURE 3) to move their ends 56 in an arcuate path and outwardly of the housing through the slots therein.

The fingers 62 first engage the side of the reel 12 and resiliently push the reel towards the shoulder 104 on the supporting member 28. Should the reel have been placed in a slightly cocked position on the assembly, as shown in FIGURE 3, the fingers will overcome this condition and align the reel, which eliminates any tendency of the reel to be cocked on the assembly 10 prior to being secured thereon.

Figure 4:
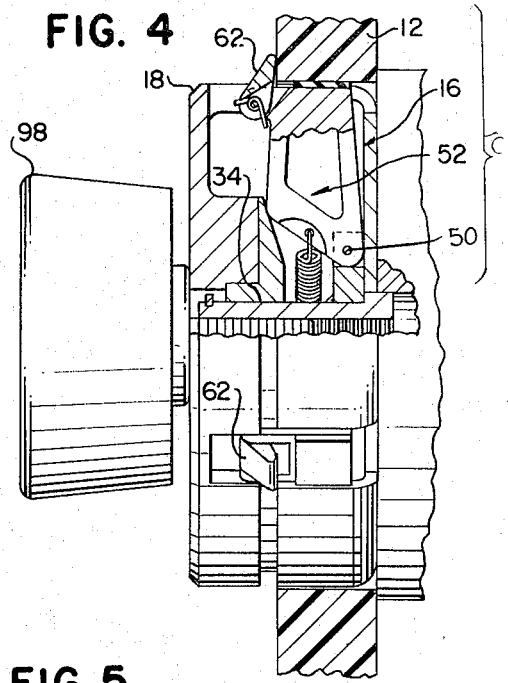
FIGURE 4 is a view partly in section and similar to FIGURE 3 but showing the assembly in full retaining position, with the reel properly aligned and held by the reel retaining assembly of this invention.

As the jaw members continue through their arcuate movement by pivoting about the pins 50, the pads 56 of the jaw members begin to move out of the slots in the housing. Since the reel has already been pushed against the shoulder 104 of the supporting member 28 by the fingers 62, the pads of the jaw members engage the inner diameter of the reel to align the reel with respect to the supporting member and thereafter to secure the reel on the assembly 10, as shown in FIGURE 4.

Mounting and removing the reel can be accomplished with one hand, as the reel is automatically aligned by the fingers 62 and secured by the pads 56. In a typical case, only two and one half turns of the knob 98 are sufficient to lock the reel on the assembly. To remove the reel, the knob 98 is turned in a direction to withdraw the screw 96 from the cylindrical member 34, thereby permitting the springs 68 to pivotally move the jaw members counter-clockwise (FIGURE 3), which movement of the jaw members releases the reel and withdraws the jaw members inside the housing members, permitting the reel to be removed from the assembly.

While the number of jaw members used in this invention may be changed without departing from the spirit of this invention, three equally spaced jaw members positioned along radial lines are especially desirable, as they collectively provide three points on which the reel can be securely and accurately centered and held for concentric rotation with the rotating member of the machine. In a usual application, the assembly 10 is driven by the supporting member 28; however, the assembly 10 may be used to drive the member 28.

Figure 7:
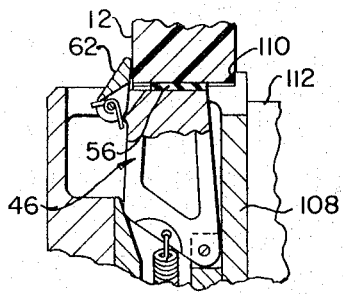
FIGURE 7 is a view similar to the area C of FIGURE 4 but showing a modified form of the housing member which is secured to the rotatable supporting member and which housing member is provided with a shoulder against which the reel may abut.

In order to increase the versatility of the reel retaining assembly, the housing 108, which is similar to the housing 16, may be provided with an annular rim 110, against which the reel 12 abuts, instead of permitting the reel to abut against the shoulder 104 of the supporting member 28, as shown in FIGURE 7. By providing the rim, the mounting assembly may be used with supporting members 112, having diameters smaller than the the inner mounting diameter of the reel.

The jaw members 46 are identical and may be made of suitable metals and should be held to close tolerances so as to enable their outer ends to emerge simultaneously from the slots and engage and support the reel 12. As the outer ends of the jaw members move outwardly of the housing, the fingers 62 slide radially outwardly against the side of the reel after first shifting the reel 12 in an axial direction towards the supporting member 28. The tension of the spring 64 can be selected to get the required amount of force necessary to shift the reel 12 in an axial direction towards the supporting member to properly position the reel prior to its being secured in place by the reel retaining assembly 10.

While the specific embodiments disclosed herein have shown the housing members as being generally cylindrical in shape, these members need not be cylindrical or round as long as they provide sufficient bearing surfaces for the reel.

What is claimed is:
1. A reel retaining assembly comprising:
   housing means having a base adapted to be secured to a rotatable member for concentric rotation therewith and also having an outer perimeter adapted to receive the mounting aperture of a reel to be supported by said assembly,
   said outer perimeter having slots in equally spaced relation thereabout, jaw means positioned along radial lines in said housing means and having first and second ends,
means for pivotally mounting said first ends of said jaw means in said housing means,
and actuating means to pivot said jaw means and move said second ends out of said housing means through said slots,
said second ends having thereon means to first resiliently engage said reel and move it in a direction towards said base and secondly to releasably hold said reel on said assembly upon the movement of said second ends out of said housing means.

2. A reel retaining assembly comprising:
cylindrically-shaped housing means having a base adapted to be secured to a rotatable member for concentric rotation therewith and adapted to receive the central mounting aperture of a reel to be supported by said assembly, said housing means also having slots distributed around the perimeter thereof in equally spaced relation,
jaws means positioned in said housing means along radial lines therein in alignment with said slots and having first and second ends, said first ends being pivotally secured in said housing means,
said second ends having projection members pivotally mounted thereon to resiliently urge said reel towards said base,
and actuating means in said housing means to engage said jaw means and pivot them about their first ends to move said second ends out of said housing means through said slots whereby said projection members will resiliently urge said reel towards said base prior to said second ends moving out of said slots to engage the inside of said central mounting aperture of said reel and releasably hold said reel on said assembly.

3. A reel retaining assembly comprising:
a first cup-shaped housing having a base adapted to be secured to a rotatable member for concentric rotation therewith,
a second cup-shaped housing slidably mounted in said first housing for telescoping engagement therewith,
at least said first housing having a circumferential wall portion adapted to slidably receive the mounting aperture of a reel to be mounted thereon, said second housing also having a circumferential wall portion,
both said wall portions having slots equally spaced and distributed on the perimeters thereof through which said jaw members may pass,
equally spaced identical jaw members positioned along radial lines in said assembly, each having one end pivotally secured to said first housing and each having a second end adapted to move through an arc which represents the combined movement of said second end along a radial and an axial direction out of said housing through a pertaining one of said slots in at least said first housing and adapted to engage the said mounting aperture of said reel, thereby releasably holding and centering said reel on said assembly for concentric rotation with said rotatable member,
cam means secured to said second housing and adapted to engage said jaw members between the ends thereof and move said jaw members through said arc upon the telescopic movement of said second housing towards said first housing,
and means to move said second housing towards said first housing and releasably hold the second housing in fixed relation to said first housing.

4. A reel retaining assembly comprising:
first and second cup-shaped housings each having a circular base and a circumferential wall, the wall of said second housing being slidably mounted in said first housing for telescoping engagement therewith,
jaw members having first and second ends positioned in said first housing along radial lines therein, said first ends being pivotally secured to said base thereof,
resilient means to withdraw said jaw members within said housings,
said walls having slots equally spaced around the perimeter thereof through which the said second ends of said jaw members may pass,
said base of said first housing having means thereon for securing said assembly to a driving rotating member for concentric rotation therewith,
said wall of said first member being adapted to slidably receive the mounting aperture of a reel to be supported by said assembly,
cam means secured to the base of said second housing and adapted to engage said jaw members between the ends thereof and pivot said jaw members about their first ends and move said second ends of said jaw members out of said housings through said slots and thereby engage and releasably hold the internal diameter of said reel upon the axial movement of said second housing towards said first housing,
and means to move said second housing towards said first housing and releasably hold the second housing in fixed relation to said first housing.

5. A reel retaining assembly comprising:
first and second cup-shaped housings each having a circular base and a circumferential wall, the wall of said second housing being slidably mounted in said first housing for axial movement therein to form a generally cylindrical configuration,
three identical jaw members having first and second ends, said first ends being pivotally secured to said base of said first housing along the circumference of a circle which is concentric with said base and along equally spaced radial lines on said circle,
each said wall having three slots equally spaced around the perimeter thereof, the slots of said first housing being in radial alignment with said radial lines,
means resiliently urging said jaw members towards the longitudinal axis of said first housing and away from the base thereof,
said base of said first housing having means thereon for securing said assembly to a rotating member for concentric rotation therewith,
said wall of said first member being adapted to slidably receive the mounting aperture of a reel to be supported by said assembly,
a finger member pivotally secured to each said second end,
means to resiliently urge said finger member towards said base of said first housing,
cam means in said second housing secured to the base thereof and adapted to engage said jaw members between the ends thereof and pivot said jaw members about their first ends and move said second ends of said jaw members out of said housings through said slots along an arc upon the axial inward movement of said second housing in said first housing,
said second ends being adapted to engage said mounting aperture of said reel and releasably hold and center said reel for concentric rotation with said rotating member upon movement along said arc,
said finger members being adapted to resiliently urge said reel towards said base of said first housing prior to said second ends engaging the mounting aperture of said reel,
and means to move said second housing towards said first housing and releasably hold the second housing in fixed relation to said first housing.

6. In combination,
a rotatable member having a face perpendicular to the axis of rotation thereof,
a reel retaining assembly and means for securing said assembly to said face for concentric rotation with said member, and a reel aligned and secured to said assembly for concentric rotation therewith, said assembly comprising a housing having first and second members in telescoping engagement with each other, said housing being adapted to slidably receive the mounting aperture of said reel, said housing having slots in equally spaced relation on the perimeter thereabout, jaw means positioned in said housing along radial lines therein and having first and second ends, said first ends being pivotally secured to one of said housing members, cam means secured to the other of said housing members and adapted to engage said jaw means between the ends thereof and pivot said jaw means about their first ends and move said second ends out of said housing through said slots, said second ends having resilient means thereon to urge said reel against said face and support said reel on said aperture for concentric rotation with said assembly, and means to move said first and second members of said housing in axial directions along said axis of rotation.

References Cited by the Examiner
UNITED STATES PATENTS 2,882,078 4/1959 MacDonald _____ 242—68.3 X
2,983,460 5/1961 Wright _____ 242—68.3

FRANK J. COHEN, *Primary Examiner.*

N. L. MINTZ, *Assistant Examiner.*